(12) United States Patent
Cho

(10) Patent No.: US 8,660,999 B2
(45) Date of Patent: Feb. 25, 2014

(54) METHOD AND APPARATUS FOR ENCODING MEDIA CONTENT AND METADATA THEREOF

(75) Inventor: Kyung-sun Cho, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 439 days.

(21) Appl. No.: 12/170,917

(22) Filed: Jul. 10, 2008

(65) Prior Publication Data

US 2009/0100083 A1 Apr. 16, 2009

(30) Foreign Application Priority Data

Oct. 16, 2007 (KR) ........................ 10-2007-0104031

(51) Int. Cl.
*G06F 7/00* (2006.01)
*G06F 17/00* (2006.01)

(52) U.S. Cl.
USPC ........................................ 707/693

(58) Field of Classification Search
USPC ........... 707/913, 999.101, 999.107, 705, 693, 707/687
See application file for complete search history.

(56) References Cited

U.S. PATENT DOCUMENTS 5,623,424 A * 4/1997 Azadegan et al. ............ 708/203
7,613,727 B2 11/2009 Visharam et al.

2005/0234731 A1 10/2005 Sirivara et al.
2005/0275752 A1 12/2005 Li et al.
2006/0060764 A1 * 3/2006 Rodi ........................ 250/231.13

FOREIGN PATENT DOCUMENTS

| EP | 1453000 A3 | 2/2004 |
| JP | 10-2004-0106414 A | 12/2004 |
| JP | 2005-136810 A | 5/2005 |
| JP | 2006-503517 A | 1/2006 |
| JP | 2006-505024 A | 2/2006 |
| JP | 10-2007-0051757 A | 5/2007 |
| KR | 1020050006565 A | 1/2005 |
| WO | 2006/047448 A2 | 5/2006 |

OTHER PUBLICATIONS

Communication issued Aug. 16, 2012 by the State Intellectual Property Office of the People's Republic of China in counterpart Chinese Application No. 200880111818.3.
Communication dated Nov. 22, 2011 from the State Intellectual Property Office of P.R. China in counterpart Chinese application No. 200880111818.3.
Communication, dated Feb. 21, 2013, issued by the State Intellectual Property Office of the People's Republic of China in counterpart Chinese Application No. 200880111818.3.
Communication, dated Nov. 13, 2012, issued by the Japanese Patent Office in counterpart Japanese Patent Application No. 2010-529843.

\* cited by examiner

*Primary Examiner* — Alexey Shmatov
(74) *Attorney, Agent, or Firm* — Sughrue Mion, PLLC

(57) ABSTRACT

Provided is a method of encoding media content and metadata. The method includes generating a scale indicator, which indicates a unit size of information about the media content, in the metadata, and determining data areas in the metadata that have different values based on the generated scale indicator. Accordingly, a range that can be expressed by the data area, that has a limited space in the metadata, can be increased.

19 Claims, 5 Drawing Sheets

| | | SCALE | STEP NUMBER | OFFSET |
|---|---|---|---|---|
| S1 | 0 x x x x x x x | 1x | 2^7 = 128 | 128*0 = 0 |
| S2 | 1 0 x x x x x x | 2x | 2^6 = 64 | 128*1 = 128 |
| S3 | 1 1 0 x x x x x | 4x | 2^5 = 32 | 128*2 = 256 |
| S4 | 1 1 1 0 x x x x | 8x | 2^4 = 16 | 128*3 = 384 |
| S5 | 1 1 1 1 0 x x x | 16x | 2^3 = 8 | 128*4 = 512 |
| S6 | 1 1 1 1 1 0 x x | 32x | 2^2 = 4 | 128*5 = 640 |
| S7 | 1 1 1 1 1 1 0 x | 64x | 2^1 = 2 | 128*6 = 768 |
| S8 | 1 1 1 1 1 1 1 0 | 128x | 2^0 = 1 | 128*7 = 896 |
| S9 | 1 1 1 1 1 1 1 1 | 256x | 2^0 = 1 | 128*8 = 1024 |

FIG. 4
| | | | | | | | | | SCALE | STEP NUMBER | OFFSET |
|---|---|---|---|---|---|---|---|---|---|---|---|
| S1 | 0 | x | x | x | x | x | x | x | 1x | 2^7 = 128 | 128*0 = 0 |
| S2 | 1 | 0 | x | x | x | x | x | x | 2x | 2^6 = 64 | 128*1 = 128 |
| S3 | 1 | 1 | 0 | x | x | x | x | x | 4x | 2^5 = 32 | 128*2 = 256 |
| S4 | 1 | 1 | 1 | 0 | x | x | x | x | 8x | 2^4 = 16 | 128*3 = 384 |
| S5 | 1 | 1 | 1 | 1 | 0 | x | x | x | 16x | 2^3 = 8 | 128*4 = 512 |
| S6 | 1 | 1 | 1 | 1 | 1 | 0 | x | x | 32x | 2^2 = 4 | 128*5 = 640 |
| S7 | 1 | 1 | 1 | 1 | 1 | 1 | 0 | x | 64x | 2^1 = 2 | 128*6 = 768 |
| S8 | 1 | 1 | 1 | 1 | 1 | 1 | 1 | 0 | 128x | 2^0 = 1 | 128*7 = 896 |
| S9 | 1 | 1 | 1 | 1 | 1 | 1 | 1 | 1 | 256x | 2^0 = 1 | 128*8 = 1024 |
FIG. 5A
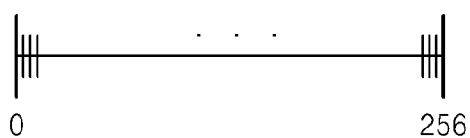
FIG. 5B
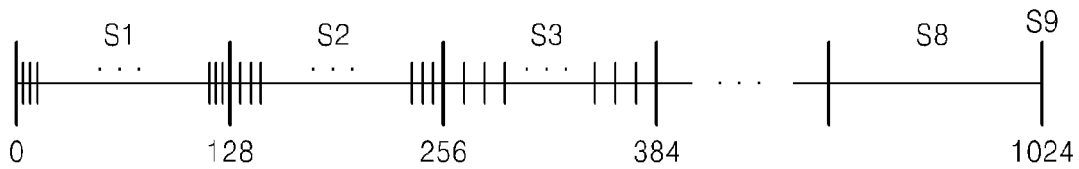

METHOD AND APPARATUS FOR ENCODING MEDIA CONTENT AND METADATA THEREOF

CROSS-REFERENCE TO RELATED PATENT APPLICATION

This application claims priority from Korean Patent Application No. 10-2007-0104031, filed on Oct. 16, 2007, in the Korean Intellectual Property Office, the disclosure of which is incorporated herein in its entirety by reference.

BACKGROUND OF THE INVENTION

1. Field of the Invention

The present invention relates to a method of encoding media content and metadata, and more particularly, to a method and apparatus for encoding media content and metadata, such that the method and apparatus can increase the maximum range of expressing information in a data area included in the metadata, which has a fixed length and some examples of which are a metadata field of a media file format or a header field of a transmission packet in a media transmission framework.

2. Description of the Related Art

FIGS. 1A and B are graphs illustrating relationships between a field length, a maximum range, and resolution, as required in encoding metadata.

Referring to FIGS. 1A and B, a field length, a maximum range, and resolution are shown. The field length is the number of bits required in metadata of media content, i.e., the length of a metadata field, and the maximum range is a range of information that can be expressed by the metadata. Also, the resolution is the resolution of the information that can be expressed by the metadata, i.e., how accurately a value of the metadata can be shown according to the unit size of the information that can be expressed by the metadata.

By comparing FIGS. 1A and B, it can be seen that when the same maximum range is to be expressed, the required field length differs according to the resolution. In other words, in FIG. 1A, in order to express a value of m1 as resolution (n−1) 110, a field length of 11 is required. However, in FIG. 1B, in order to express the same value of m1 (m2) as resolution (n+2) 120, a field length of 12, higher than 11, is required. In other words, to express the same maximum range, the required field length differs according to how accurately the metadata indicates corresponding information of the media content.

Since the metadata, such as a metadata field of a media file format or a header field of a transmission packet in a media transmission framework, is relatively important in the entire file or stream, the number of required bits in the metadata needs to be reduced in order to increase encoding efficiency.

Moreover, when conventional metadata, of which the length is fixed, is used, a field length of the metadata is determined according to the maximum range of the worst case. Alternatively, an external signaling is periodically applied when the field length of the metadata flexibly changes by changing the resolution according to a section of the media content. However, in the above two cases, unrequired bits are wasted or additional bits are required.

SUMMARY OF THE INVENTION

The present invention provides an encoding method and encoding apparatus, which can increase a range of information that can be expressed even when metadata has a field structure of a fixed length by generating a varying scale indicator in the metadata.

According to an aspect of the present invention, there is provided a method of encoding media content and metadata of the media content, the method including: generating a scale indicator, which indicates a unit size of information about the media content, in the metadata; and determining data areas in the metadata that have different values based on the generated scale indicator.

The scale indicator may vary according to the maximum range of the information indicated in the data area or accuracy required in the information.

The scale indicator may be changed so as to increase the unit size of the information as the maximum range of the information increases or the accuracy required in the information decreases.

The method may further include assigning a field barrier, which classifies a boundary of the scale indicator and the data area, in the metadata.

The determining of the data areas may determine the data areas to have different values by an offset value according to the scale indicator.

The metadata may have a data structure in a fixed length. The information indicated in the data area may be time information about the media content.

The method may further include aligning the media content according to the unit size indicated by the scale indicator, when the information indicated in the data area is location information about the media content.

The aligning of the media content may stuff dummy data correspondingly to the unit size indicated by the scale indicator.

The method may further include inserting an identification code, which indicates a starting location of the media content, when the information indicated in the data area is location information about the media content.

According to another aspect of the present invention, there is provided an apparatus for encoding media content and metadata of the media content, the apparatus including: a scale indicator generator which generates a scale indicator, which indicates a unit size of information about the media content, in the metadata; and a data area determiner which determines data areas in the metadata that have different values based on the scale indicator generated by the scale indicator generator.

The scale indicator generator may variably generate the scale indicator according to the maximum range of the information indicated in the data area or accuracy required in the information.

The scale indicator generator may generate the scale indicator in such a way that the unit size of the information increases as the maximum range of the information increases or the accuracy required in the information decreases.

The apparatus may further include a field barrier assigner which assigns a field barrier, which classifies a boundary of the scale indicator and the data area, in the metadata.

The data area determiner may determine the data areas to have different values by an offset value according to the scale indicator.

The metadata may have a data structure in a fixed length. The information indicated in the data area may be time information about the media content.

The apparatus may further include a first media content processor which aligns the media content according to the unit size indicated by the scale indicator, when the information indicated in the data area is location information about the media content.

The first media content processor may stuff dummy data correspondingly to the unit size indicated by the scale indicator.

The apparatus may further include a second media content processor which inserts an identification code, which indicates a starting location of the media content, when the information indicated in the data area is location information about the media content.

According to another aspect of the present invention, there is provided a computer readable recording medium having recorded thereon a program for executing a method of encoding media content and metadata of the media content, the method including: generating a scale indicator, which indicates a unit size of information about the media content, in the metadata; and determining data areas in the metadata that have different values based on the generated scale indicator.

BRIEF DESCRIPTION OF THE DRAWINGS

The above and other features and advantages of the present invention will become more apparent by describing in detail exemplary embodiments thereof with reference to the attached drawings in which:

FIG. 4 is a diagram of a case when a scale indicator is applied to an 8-bit metadata, according to an exemplary embodiment of the present invention;

FIGS. 5A and B are diagrams for visibly comparing 8-bit metadata having a fixed scale and the 8-bit metadata of FIG. 4, respectively, according to an embodiment of the present invention;

DETAILED DESCRIPTION OF EXEMPLARY EMBODIMENTS OF THE INVENTION

Figure 1A:
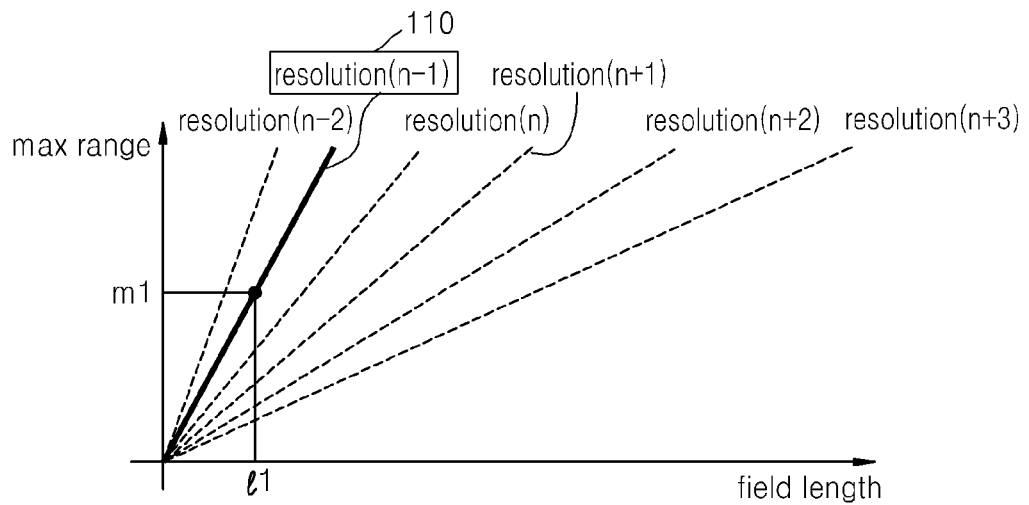
FIGS. 1A and B are graphs illustrating relationships between a field length, a maximum range, and resolution, as required in encoding metadata.
Figure 1B:
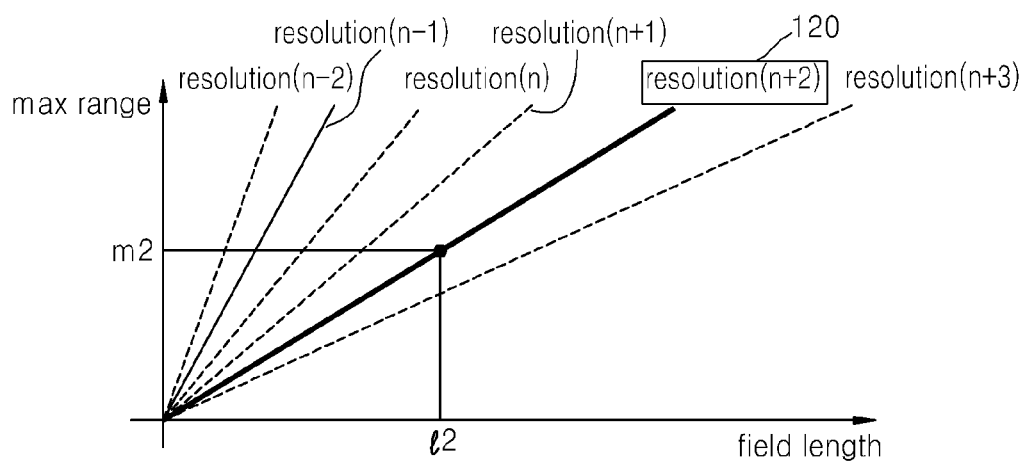

The attached drawings for illustrating embodiments of the present invention are referred to in order to gain a sufficient understanding of the present invention, the merits thereof, and the objectives accomplished by the implementation of the present invention. In the drawings, like reference numerals denote like elements, and the sizes and thicknesses of features may be exaggerated for clarity.

Hereinafter, the present invention will be described in detail by explaining embodiments of the invention with reference to the attached drawings.

Figure 2:
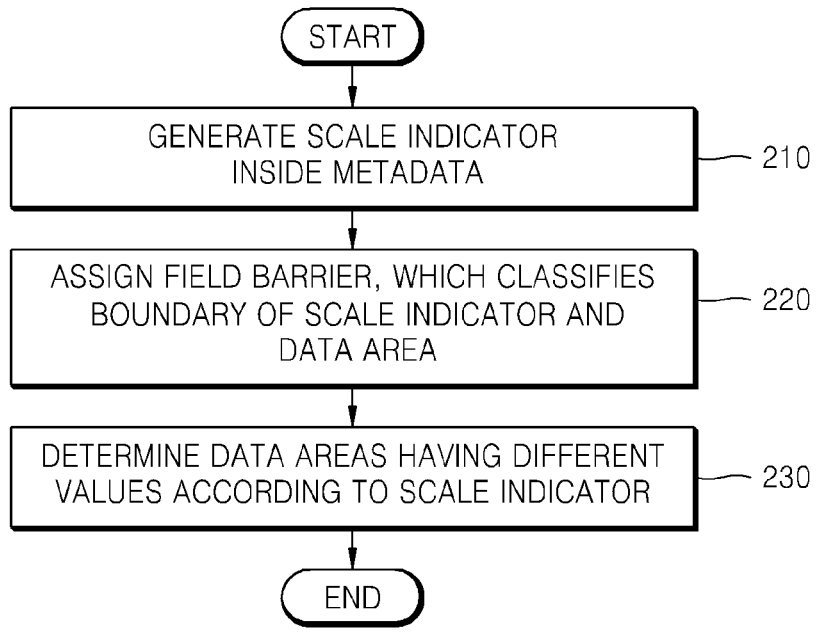
FIG. 2 is a flowchart of a method of encoding media content and metadata, according to an exemplary embodiment of the present invention.
Figure 2:
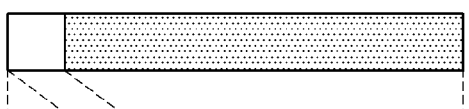

FIG. 2 is a flowchart of a method of encoding media content and metadata, according to an embodiment of the present invention.

In a recent media system, characteristics of media content are changing from continuous to discontinuous, from audio/visual (A/V) data to rich media data, and from an accurate focus of time information to an approximate focus of time information.

Accordingly, metadata needs to be designed to have higher compression efficiency by using the changed characteristics of media content. Metadata of the present invention can be applied to a media data storage format (media file format), such as ISO base media file format (ISO/IEC 14496-12), and to a media transmission framework, such as an MPEG-2 system (ISO/IEC 13818-1). In addition, the metadata of the present invention can be applied to a media metadata framework, such as an MPEG-4 system (ISO/IEC 14496-1) or an MPEG-4 LASeR/SAF system (ISO/IEC 14496-20). Moreover, the metadata of the present invention can be applied to a media player framework supporting the media data storage format (media file format), and to a media processing terminal, such as a TV, an STB, a PMP, an MP3, a mobile broadcast terminal, or a mobile phone.

Referring to FIG. 2, the method includes generating a scale indicator, which indicates a unit size of information about media content, in metadata (operation 210) and determining data areas in the metadata that have different values based on the generated scale indicator (operation 230). Selectively, the method further includes assigning a field barrier, which classifies a boundary of the scale indicator and the data area, in the metadata (operation 220).

In operation 210, the scale indicator is generated in the metadata, and the scale indicator is an indicator that defines a scale of information expressed by a data area of the current metadata. In other words, the scale indicator indicates whether the information about the media content is accurately shown based on a unit size. In the case of conventional metadata without any scale indicator, a scale is assumed to be 1× (one time).

The scale indicator varies according to a maximum range of the information about the media content expressed in the data area or accuracy required by the information. During binary coding, the maximum range of information that can be expressed by conventional metadata having a data structure of a fixed n bits length is between 0 and 2n−1. Here, a scale is 1×. However, since the scale of the present invention varies, the maximum range of the information that can be expressed also varies, and resolution, which is the accuracy of the information, changes as a trade-off. In detail, when the scale increases, the range of information that can be expressed with the same number of bits increases while the resolution decreases.

In operation 220, the field barrier, which classifies the boundary of the scale indicator and the data area, is assigned. Since the varying scale indicator of the present invention is generated in the metadata, the field barrier is assigned to the metadata so that the scale indicator can be extracted without any external signaling. Accordingly, since the scale indicator and the data area can be classified, a value of the data area can be scaled-up by first reading the scale indicator and then interpreting the value of the data area according to the corresponding scale.

In operation 230, the data areas having different values are determined according to the scale indicator. In other words, since the values of the data areas are interpreted differently by the scale indicator, the values of the data areas to be expressed are determined suitably to scales according to the generated scale indicator during a coding process. This will be described in detail with reference to FIG. 4 later.

Figure 3A:
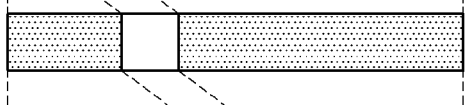
FIGS. 3A, B and C are diagrams illustrating a data structure of metadata including a scale indicator, according to an exemplary embodiment of the present invention.
Figure 3B:
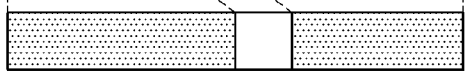
Figure 3C:
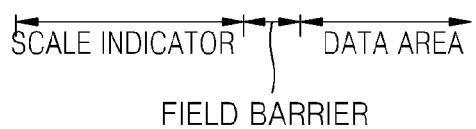

FIGS. 3A, B and C are diagrams illustrating a data structure of metadata including a scale indicator, according to an embodiment of the present invention.

Referring to FIGS. 3A, B, and C, the data structures of metadata are each formed of a scale indicator, a field barrier, and a data area. Here, the field barrier is a predetermined value of a fixed length, however the length of the each field of the scale indicator and the data area can vary. In addition, the length of the entire field of the metadata is fixed, and thus the scale indicator and the data area have exclusive areas within a limited total length of the metadata. An embodiment of such metadata is as follows.

FIG. 4 is a diagram illustrating a case when a scale indicator is applied to 8-bit metadata, according to an embodiment of the present invention.

In FIG. 4, different cases of setting values of the scale indicator and a data area in the 8-bit metadata are shown.

Here, a scale is a unit size of information expressed by a value of a data area. The interval of values expressed in the data area of the metadata is determined according to such a scale. A step number shows the number of all expressed discrete values while interpreting a value of data area according to a scale. An offset denotes a starting value in each of the cases from s1 to s9.

For example, the cases from s1 to s3 will now be described. Here, it is assumed that a scale indicator has a value of 1 and a field barrier has a value of 0.

(s1): There is no bit assigned to a scale indicator. In other words, a scale is 1×, and a first bit from among 8 bits is a field barrier. The remaining 7 bits are a data area, and thus step numbers are $2^7=128$. An offset is set to be 128*0=0. Accordingly, in the case of s1, the data area can express values from 0 to 128 in an interval of 1×.

(s2): A first bit is a scale indicator. In other words, a scale is 2×, and since a data area, excluding a field barrier, is 6 bits, step numbers are $2^6=64$. An offset is set to be 128*1=128. Thus in the case of s2, the data area can express 64 values from 128 in an interval of 2×.

(s3): First two bits are a scale indicator. In other words, a scale is 4×, and since a data area, excluding a field barrier, is 5 bits, step numbers are $2^5=32$. An offset is set to be 128*2=256. Accordingly in the case of s3, the data area can express 32 values from 256 in an interval of 4×.

Cases from s4 to s9 can be described as above.

Accordingly, the metadata having a length of 8 bits as illustrated in FIG. 4 can express 1024 values as the maximum range.

FIGS. 5A and B are diagrams for visibly comparing 8-bit metadata having a fixed scale and the 8-bit metadata of FIG. 4, respectively, according to an embodiment of the present invention.

FIG. 5A illustrates a maximum range and resolution that can be expressed by the 8-bit metadata having a fixed scale, and FIG. 5 B illustrates a maximum range and resolution expressed by the 8-bit metadata of FIG. 4.

First, by referring to FIG. 5A, a scale of the 8-bit metadata that does not include a scale indicator is fixed to 1×, and thus a range from 0 to 256 can be expressed in an interval of 1×.

However, by referring to the 8-bit metadata that includes a varying scale indicator of FIG. 5 B, a scale is 1× in case s1, and thus a range from 0 to 128 can be expressed in an interval of 1×, a scale is 2× in case s2, and thus a range from 128 to 256 can be expressed in an interval of 2×, and a scale is 4× in case s3, and thus a range from 256 to 384 can be expressed in an interval of 4×. Accordingly, a range to 1024 can be expressed in case s9.

Thus as shown in FIG. 5 B, as the scale increases by two times for each of the cases from s1 to s9, the resolution decreases by half, however the value of the maximum range that can be expressed increases to 1024.

Specifically in the case of time information about media content, which is essential in metadata, a user of the media content cannot perceive reduction of temporal accuracy because of the visual/auditory characteristics of humans. By using such a principle, an encoding method, as an embodiment of the present invention, that has a high compression rate can be provided.

Figure 6:
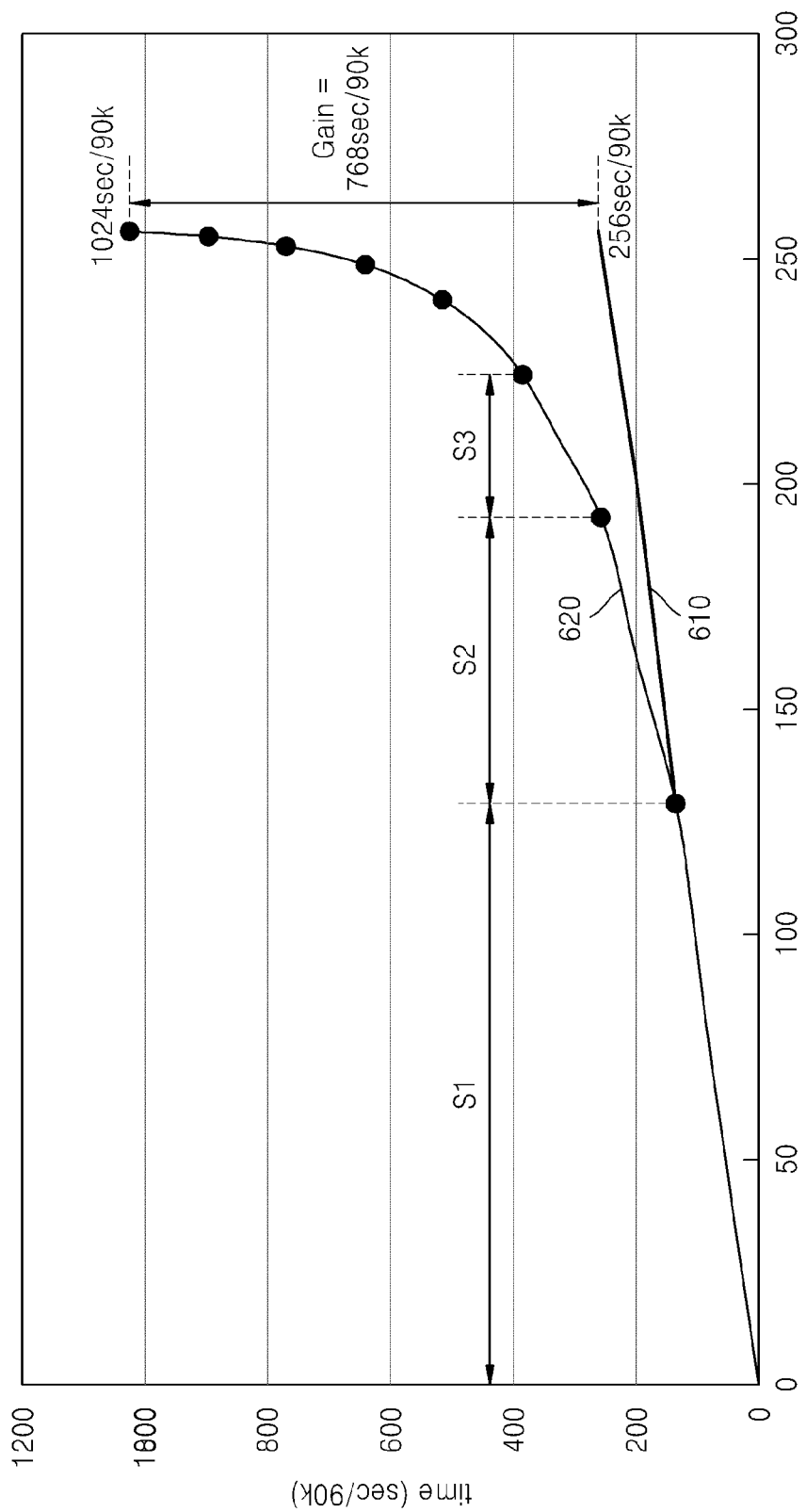
FIG. 6 is a graph illustrating a relationship between the maximum range and the resolution of the 8-bit metadata of FIG. 5A and FIG. 5B.

FIG. 6 is a graph illustrating relationships between the maximum range and the resolution of the 8-bit metadata of FIGS. 5A and B.

In FIG. 6, a curve 610 of the 8-bit metadata that does not include a scale indicator as FIG. 5A and a curve 620 of the 8-bit metadata including a varying scale indicator as FIG. 5B are illustrated.

In the case of s1, the curves 610 and 620 are the same. However, in the case of s2, the curve 620 has a steeper slope than the curve 610. At this time in the curve 620, an offset is 128 sec/90 k, a step number is 64, and the resolution is 45 kHz. In the case of s3, the curve 620 has a steeper slope than the case of s2. At this time in the curve 620, an offset is 256 sec/90 k, a step number is 32, and the resolution is 45 kHz. As such, the curve 620 reaches the maximum range, i.e., 1024 sec/90 k, and compared to the curve 610, the curve 620 has a gain of 768 sec/90 k.

Figure 7A:
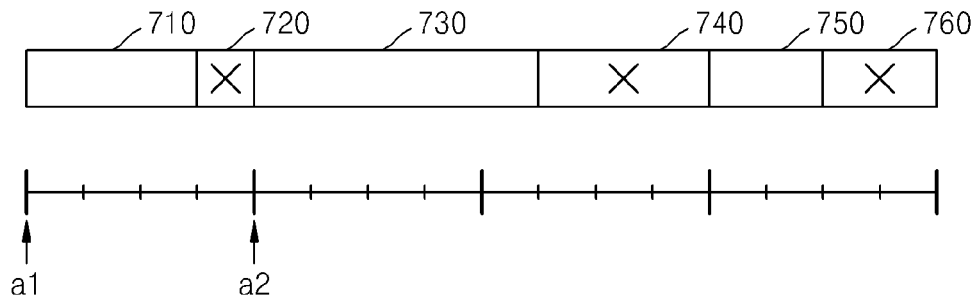
FIGS. 7A and B are diagrams for describing a case when location information of media content is searched for, according to an exemplary embodiment of the present invention.

FIGS. 7A and B are diagrams for describing a case when location information of media content is searched for, according to an embodiment of the present invention.

When information expressed in a data area of metadata requires accuracy, such as location information about the media content, unlike the time information described above, the media content is encoded by being processed as illustrated in FIG. 7A or B.

In other words, in order to find an accurate location of the media content even when the media content is searched for by a value of a scaled-up data area, the present invention suggests the following two cases.

Referring to FIG. 7A, a process of aligning media content according to a unit size of information indicated by a scale indicator is performed. In FIG. 7A, areas 710, 730, and 750, which are empty in a stream of the media content, store data of a predetermined content, and areas 720, 740, and 760 with an X mark are areas for dummy data. When a unit that can be expressed by metadata by a scale is 4-bytes, an a2 location should be accessed after an a1 location. Accordingly, when content data area 710 is 3 bytes, 1 byte of dummy data area 720 is additionally stuffed so that the total size of data is 4 bytes. Similarly, when content data area 730 is 5 bytes, 3 bytes of dummy data area 740 is additionally stuffed so that the total size of data is 8 bytes. Accordingly, the media content is aligned and encoded after making the content data to be a multiple of the scale.

Figure 7B:
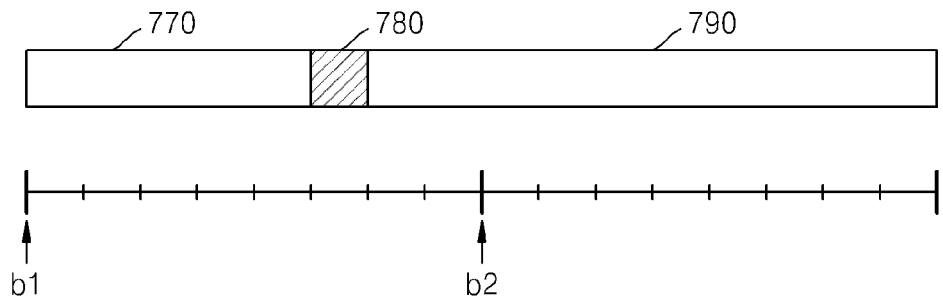

Also, by referring to FIG. 7 B, an identification code 780, such as a start symbol, may be used instead of dummy data. In other words, when a unit that can be expressed by metadata by a scale is 8-bytes, a b2 location is accessed after a b1 location. Accordingly, when a content data area 770 is 5 bytes, the identification code 780 of 1 byte is inserted to inform a user of the start of a next content data area 790. Thus, after roughly accessing the b1 location, an exact location of the content data area 790 can be found by searching for the identification code 780, which functions as a start symbol.

The above method can be selectively used according to a size of the stuffed dummy data in FIG. 7A and the complexity of searching for an identification code in FIG. 7 B.

Figure 8:
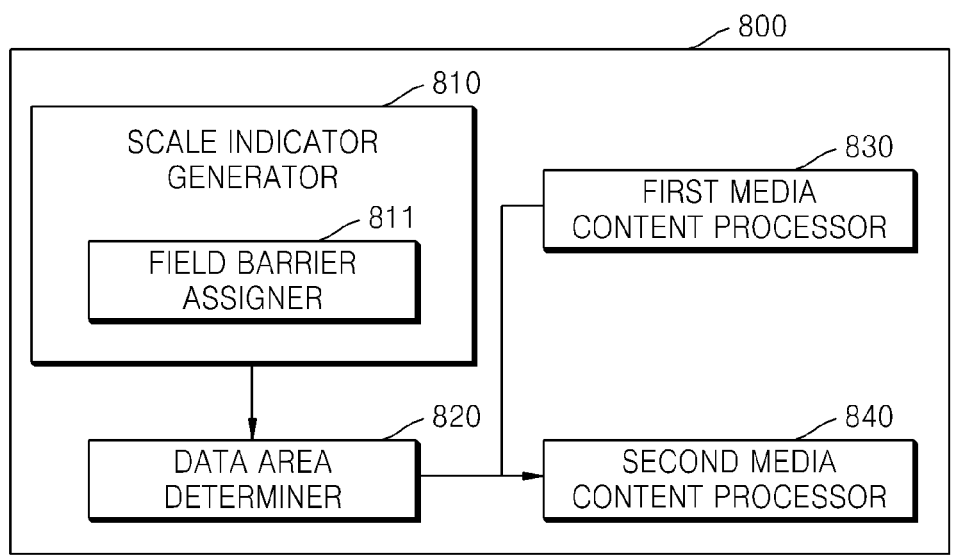
FIG. 8 is a block diagram of an apparatus for encoding media content and metadata, according to an exemplary embodiment of the present invention.

FIG. 8 is a block diagram of an apparatus 800 for encoding media content and metadata, according to an embodiment of the present invention.

Referring to FIG. 8, the apparatus 800 includes a scale indicator generator 810 generating a scale indicator, which is a unit size of information about media content, in metadata, and a data area determiner 820 determining data areas included in the metadata that have different values based on the scale indicator generated by the scale indicator generator 810. The scale indicator generator 810 includes a field barrier assigner 811 assigning a field barrier, which classifies a boundary of the scale indicator and the data area, in the metadata.

If the information expressed in the data area is location information about the media content, the apparatus 800 further includes a first media content processor 830 aligning the media content according to the unit size of the information indicated by the scale indicator. The first media content processor 830 inserts dummy data to data of the media content correspondingly to a scale indicated by the scale indicator. In this case, the apparatus 800 may further include a second media content processor 840 inserting an identification code, which indicates a starting location of the media content. The apparatus 800 may selectively use the first media content processor 830 and the second media content processor 840.

The embodiments of the present invention can be written as computer programs and can be implemented in general-use digital computers that execute the programs using a computer readable recording medium.

Also, the structure of the data used in the present invention may be recorded on a computer readable recording medium through various means or transmitted on a computer readable transmission medium by various means.

Examples of the computer readable recording medium include magnetic storage media (e.g., ROM, floppy disks, hard disks, etc.) and optical recording media (e.g., CD-ROMs, or DVDs). An example of the computer readable transmission media is storage media such as carrier waves (e.g., transmission through the Internet).

According to a method and apparatus for encoding media content and metadata, a range of information that can be expressed by a data area, which has a limited space in the metadata, can be increased, and since a data area having the optimum field length for the metadata can be determined, the size of the metadata can be reduced and a data compression rate can be increased. Also, change of a scale of the metadata is not required to be informed by external information, and thus, the scale of the metadata can be dynamically changed.

While this invention has been particularly shown and described with reference to embodiments thereof, it will be understood by one skilled in the art that various changes in form and details may be made therein without departing from the spirit and scope of the invention as defined by the appended claims. The embodiments should be considered in descriptive sense only and not for purposes of limitation. Therefore, the scope of the invention is defined not by the detailed description of the invention however by the appended claims, and all differences within the scope will be construed as being included in the present invention.

What is claimed is:

1. A method of encoding media content and metadata of the media content, the method comprising:

generating a scale indicator by a scale indicator generator, which indicates a value of a data area of the metadata, the value of the data area corresponding to a range and interval from among different possible ranges and intervals; and determining, by a data area determiner, data areas in the metadata based on the generated scale indicator;

aligning the media content, by a first media content processor, according to the value of the data area, when information indicated in the data area is location information about the media content; and encoding the media content and metadata, by the first media content processor, according to the aligned media content and the scale indicator, wherein the metadata includes a field of the scale indicator and a field of the data area, and wherein each of the field of the scale indicator and the field of the data area has a variable length, and a sum of the length of the field of the scale indicator and the length the field of the data area remains fixed within the length of the metadata.

2. The method of claim 1, wherein the scale indicator varies according to a maximum range of the information indicated in the data area or accuracy required in the information.

3. The method of claim 2, wherein the scale indicator is changed so as to increase the value of the data area as the maximum range of the information increases or the accuracy required in the information decreases.

4. The method of claim 3, further comprising assigning a field barrier, which classifies a boundary of the scale indicator and the data area, in the metadata.

5. The method of claim 4, wherein the determining of the data areas determines the data areas to have different values by an offset value according to the scale indicator.

6. The method of claim 5, wherein the metadata has a data structure in a fixed length.

7. The method of claim 6, wherein the information indicated in the data area is time information about the media content.

8. The method of claim 6, further comprising inserting an identification code, which indicates a starting location of the media content, when the information indicated in the data area is location information about the media content.

9. The method of claim 1, wherein the aligning of the media content stuffs dummy data correspondingly to the value of the data area indicated by the scale indicator.

10. An apparatus for encoding media content and metadata of the media content, the apparatus comprising:

a hardware processor;

a scale indicator generator executed by the hardware processor, which generates a scale indicator, which indicates a value of a data area of the metadata, the value of the date area corresponding to a range and interval from among different possible ranges and intervals; and a data area determiner which determines data areas in the metadata based on the scale indicator generated by the scale indicator generator; and a first media content processor which aligns the media content according to the value of the data area, when the information indicated in the data area is location information about the media content and which encodes the media content and the metadata according to the aligned media content and the scale indicator, wherein the metadata includes a field of the scale indicator and a field of the data area, and wherein each of the field of the scale indicator and the field of the data area has a variable length, and a sum of the length of the field of the scale indicator and the length the field of the data area remains fixed within the length of the metadata.

11. The apparatus of claim 10, wherein the scale indicator generator variably generates the scale indicator according to the maximum range of the information indicated in the data area or accuracy required in the information.

12. The apparatus of claim 11, wherein the scale indicator generator generates the scale indicator in such a way that the value of the data area increases as the maximum range of the information increases or the accuracy required in the information decreases.

13. The apparatus of claim 12, further comprising a field barrier assigner which assigns a field barrier, which classifies a boundary of the scale indicator and the data area, in the metadata.

14. The apparatus of claim 13, wherein the data area determiner determines the data areas to have different values by an offset value according to the scale indicator.

15. The apparatus of claim 14, wherein the metadata has a data structure in a fixed length.

16. The apparatus of claim 15, wherein the information indicated in the data area is time information about the media content.

17. The apparatus of claim 15, further comprising a second media content processor which inserts an identification code, which indicates a starting location of the media content, when the information indicated in the data area is location information about the media content.

18. The apparatus of claim 10, wherein the first media content processor stuffs dummy data correspondingly to the value of the data area indicated by the scale indicator.

19. A tangible, non-transitory computer readable recording medium having recorded thereon a program for executing a method of encoding media content and metadata of the media content, the method comprising:

generating a scale indicator, which indicates a value of a data area of the metadata, the value of the data area corresponding to a range and interval from among different possible ranges and intervals; and determining data areas in the metadata based on the generated scale indicator;

aligning the media content, according to the value of the data area, when the information indicated in the data area is location information about the media content; and encoding the media content and metadata according to the aligned media content and the scale indicator, wherein the metadata includes a field of the scale indicator and a field of the data area, and wherein each of the field of the scale indicator and the field of the data area has a variable length, and a sum of the length of the field of the scale indicator and the length the field of the data area remains fixed within the length of the metadata.

* * * * *